(12) United States Patent
Cragun (10) Patent No.: US 6,879,331 B2
(45) Date of Patent: Apr. 12, 2005

(54) METHOD AND APPARATUS FOR IMPLEMENTING ENLARGED VIRTUAL SCREEN USING DYNAMIC ZONE-COMPRESSION OF SCREEN CONTENT

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 10/263,631

(22) Filed: Oct. 3, 2002

(65) Prior Publication Data

US 2004/0066393 A1 Apr. 8, 2004

(51) Int. Cl.[7] .............................. G09G 5/00; G09G 5/02
(52) U.S. Cl. ........................ 345/661; 345/666; 345/698
(58) Field of Search ................................ 345/660, 661, 345/662, 663, 665, 698

(56) References Cited

U.S. PATENT DOCUMENTS 5,751,283 A * 5/1998 Smith ........................ 345/798
5,920,327 A * 7/1999 Seidensticker, Jr. ......... 345/561

* cited by examiner

*Primary Examiner*—Kee M. Tung
*Assistant Examiner*—Aaron M. Richer
(74) *Attorney, Agent, or Firm*—Joan Pennington (57) ABSTRACT

A method, apparatus and computer program product are provided for implementing enlarged virtual screen using dynamic zone compression of screen content in a graphical user interface of a computer. A maximum uncompressed view window size is determined. An uncompressed area from a virtual screen is transferred to an actual screen buffer. For each zone within a compression area, a compression ratio is identified, a zone bitmap is copied and reduced according to the identified compression ratio; and the reduced zone bitmap is transferred to the actual screen buffer. The uncompressed area optionally is centered on a focus window that can change to a new window at any time, or can remain in a fixed area of the screen. Resizing the focus window optionally is restricted to the maximum uncompressed view window size. Hint text within the compression area optionally is displayed uncompressed.

13 Claims, 9 Drawing Sheets

FIG. 1A

BORDER COMPRESSION OPTIONS AND DATA 134

| COMPRESSION ON/OFF 136 |
| --- |
| BORDER COMPRESSION RATIOS 138 |
| VIRTUAL SCREEN SIZE 140 |
| COMPRESSION ON FULL SCREEN WINDOW 141 |
| MAXIMUM UNCOMPRESSED VIEW WINDOW SIZE 142 |
| COMPRESSION CENTERED ON FOCUS WINDOW 144 |
| RESIZING FOCUS WINDOW RESTRICTION 146 |
| COMPRESSION TINT AND TINT COLOR SELECTIONS 148 |
| DISPLAY HINT TINT UNCOMPRESSED 150 |

DESKTOP ZONE COMPRESSION MANAGEMENT PROGRAM 132

OPERATING SYSTEM 130

| BORDER COMPRESSION OPTIONS |

☐ INCREASE VIRTUAL SCREEN SIZE USING BORDER COMPRESSION

ACTUAL SCREEN SIZE: 800 x 600

BORDER COMPRESSION RATIO:

VIRTUAL SCREEN SIZE:

MAXIMUM UNCOMPRESSED VIEW WINDOW SIZE: 576 x 432

○ SHOW FULL SCREEN WINDOWS AT VIRTUAL SCREEN SIZE USING COMPRESSED BORDER

⦿ SHOW FULL SCREEN WINDOWS AT ACTUAL SCREEN SIZE WITH NO COMPRESSION

☑ COMPRESSION CENTERED ON FOCUS WINDOW

☐ RESTRICT RESIZING FOCUS WINDOW LARGER THAN MAXIMUM UNCOMPRESSED VIEW WINDOW SIZE

☐ TINT COMPRESSED AREAS OF SCREEN

☐ TINT AREAS OF SCREEN NOT FOCUS WINDOW

| SELECT TINT COLOR |

☐ DISPLAY HINT TEXT UNCOMPRESSED

METHOD AND APPARATUS FOR IMPLEMENTING ENLARGED VIRTUAL SCREEN USING DYNAMIC ZONE-COMPRESSION OF SCREEN CONTENT

FIELD OF THE INVENTION

The present invention relates generally to the data processing field, and more particularly, relates to a method, apparatus and computer program product for implementing enlarged virtual screen using dynamic zone compression of screen content in a graphical user interface of a computer system.

DESCRIPTION OF THE RELATED ART

Real estate on the display screen is an important issue to users of computer systems. The thrust of all graphical user interface (GUI) desktops is to manage multiple applications, each application requiring a portion of the available screen. Icons, tool bars, layouts, always-on-top, and the like are all purposed to providing quick access and change for the multiple active tasks. Screen real-estate has become a more significant issue as screen size shrinks on laptops, personal data assistants (PDAs), and phone devices.

One existing solution to screen real estate is a virtual desktop. An area larger than the displayed screen area is provided in memory, and the desktop is placed in this virtual space. The user then selects or scrolls to a portion of the virtual space to be shown. A common navigation tool is a window map that shows the layout of the virtual desk and allows navigation of a particular grid. More sophisticated maps allow limited manipulation of the application windows themselves.

Virtual desktops suffer from the very way they provide their solution. Navigation requires extra steps to get to the desired grid. Users often lose applications and can forget which particular grid that is currently accessed. The mapping is helpful but not always enough, small windows and overlapped windows can be difficult or impossible to pick out of the map.

A need exists for improved mechanism for implementing virtual desktops. It is desirable to provide an improved method and computer program product that enables an enlarged virtual screen to be displayed in a graphical user interface of a computer system.

SUMMARY OF THE INVENTION

A principal object of the present invention is to provide a method, apparatus and computer program product for implementing enlarged virtual screen using dynamic zone compression of screen content in a graphical user interface of a computer system. Other important objects of the present invention are to provide such method, apparatus and computer program product for implementing enlarged virtual screen using dynamic zone compression of screen content substantially without negative effect and that overcome many of the disadvantages of prior art arrangements.

In brief, a method, apparatus and computer program product are provided for implementing enlarged virtual screen using dynamic zone compression of screen content in a graphical user interface of a computer system. A maximum uncompressed view window size is determined. An uncompressed area from a virtual screen is transferred to an actual screen buffer. For each zone within a compression area, a compression ratio is identified, a zone bitmap is copied and reduced according to the identified compression ratio; and the reduced zone bitmap is transferred to the actual screen buffer.

In accordance with features of the invention, the uncompressed area optionally is centered on a focus window that can change to a new window at any time, or remain in a fixed area of the screen. Resizing the focus window optionally is restricted to the maximum uncompressed view window size. Hint text within the compression area optionally is displayed uncompressed.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
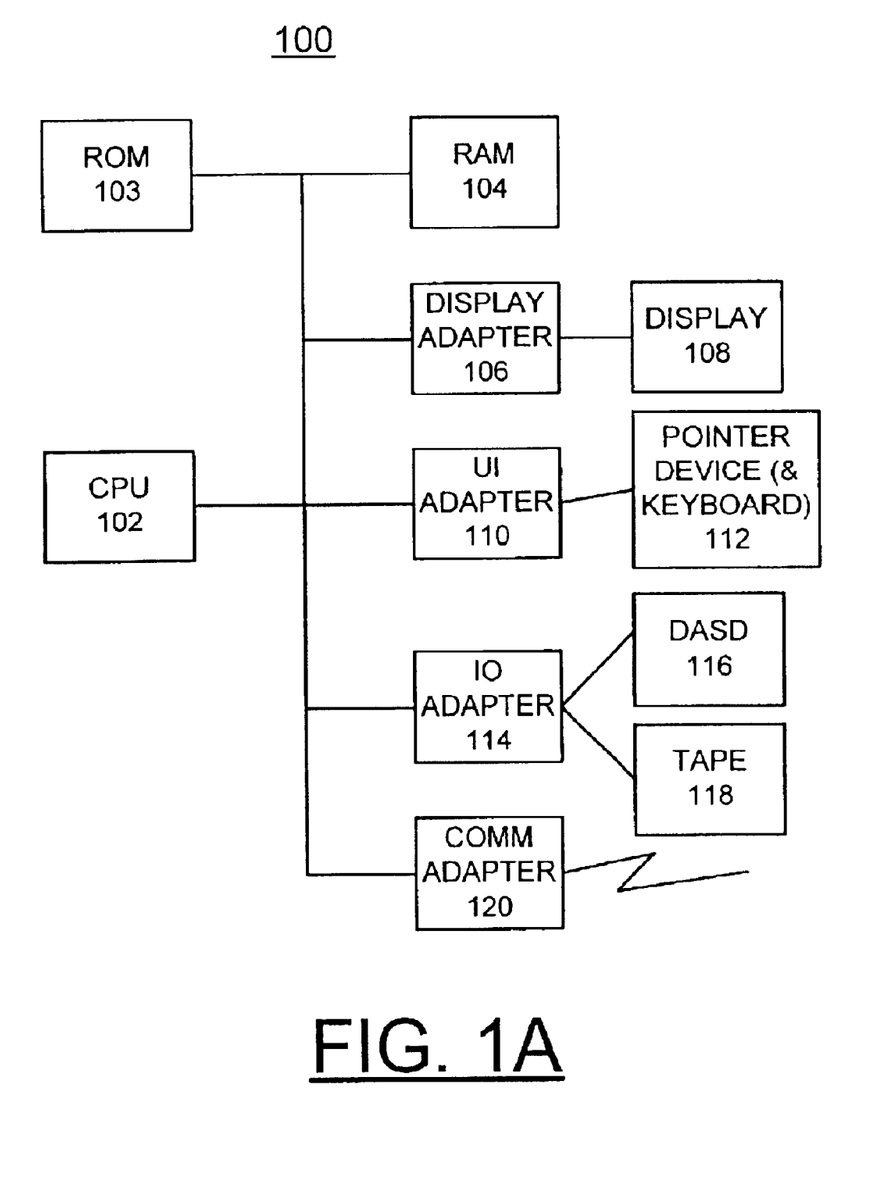
FIGS. 1A and 1B are block diagram representations illustrating a computer system and operating system for implementing enlarged virtual screen using dynamic zone compression of screen content in accordance with the preferred embodiment.
Figure 1B:
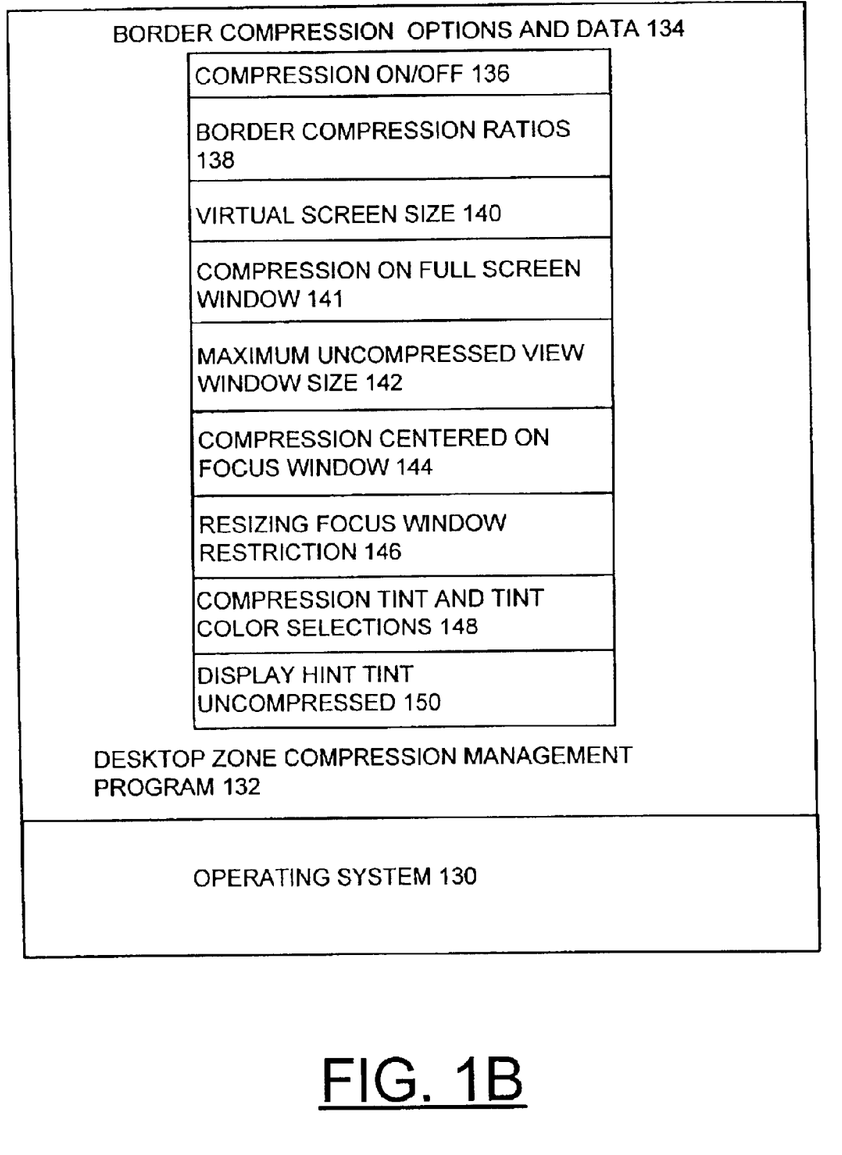

Having reference now to the drawings, in FIGS. 1A, and 1B, there is shown a computer or data processing system generally designated by the reference character 100 for implementing enlarged virtual screen using dynamic zone compression of screen content of the preferred embodiment. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130 and a desktop zone compression management program 132 of the preferred embodiment. In accordance with features of the invention, border compression options and data 134 are stored for implementing dynamic zone compression of screen content in a graphical user interface in computer system 100 in accordance with the preferred embodiment. The stored border compression options and data 134 include, for example, user selected compression on/off and compression options 136, user selected border compression ratios 138, user selected virtual screen size 140, a user selected compression centered on full screen window 141, a maximum uncompressed view window size 142, user selected compression centered on focus window 144, user selected resizing focus window restriction 146, user selected compression tint and tint color selections 148, and user selected option to display of hint text uncompressed 150.

Various commercially available computers can be used for each computer system 100, for example, an IBM personal computer. CPU 102 is suitably programmed by the desktop zone compression management program 132 to generate display screens, for example as shown in FIG. 5, to receive user selections and options, and to execute the flowcharts of FIGS. 3A, 3B, and 4 to draw screens in a graphical user interface in the computer system 100.

In accordance with features of the preferred embodiment, desktop zone compression management program 132 achieves additional space through compression of the border edge areas or compression zones. The focus area or focus window of the display desktop remains uncompressed, while the border compression zones are compressed to show more in an allotted display space. The compressed area including a plurality of compression zones is still comprehendible and is fully selectable by the user. Mouse transforms allow selection, typing and use of the compressed area of the border compression zones. A feature of the invention allows the uncompressed area to optionally follow the focus window, which can change to a new window at any time, such as illustrated in FIG. 2D. Also optionally, the uncompressed area can remain in a fixed area of the screen.

Figure 2A:
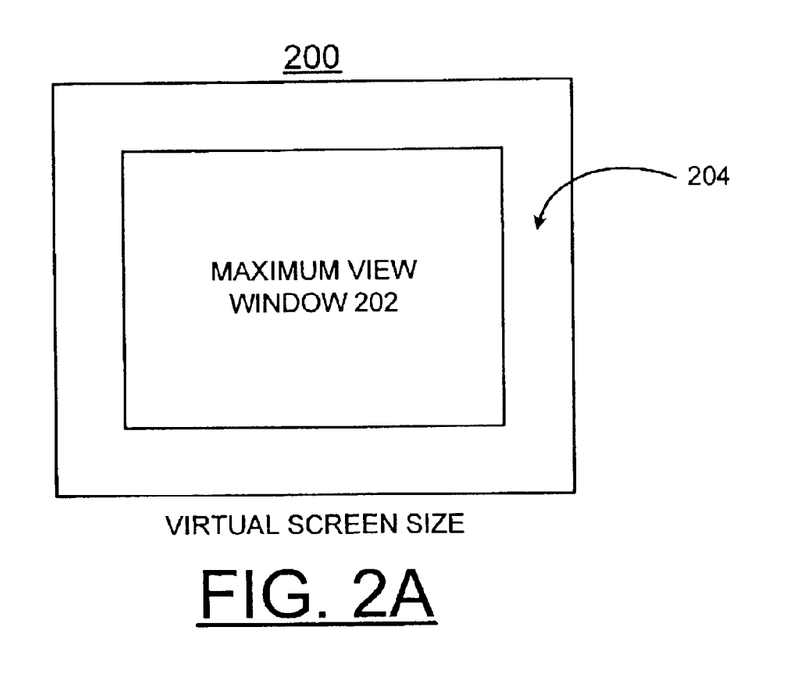
FIGS. 2A and 2B are block diagram representations respectively illustrating a virtual screen size with a maximum view window in accordance with the preferred embodiment and a virtual screen size with a maximum view window with exemplary multiple compression zones in accordance with the preferred embodiment.
Figure 2B:
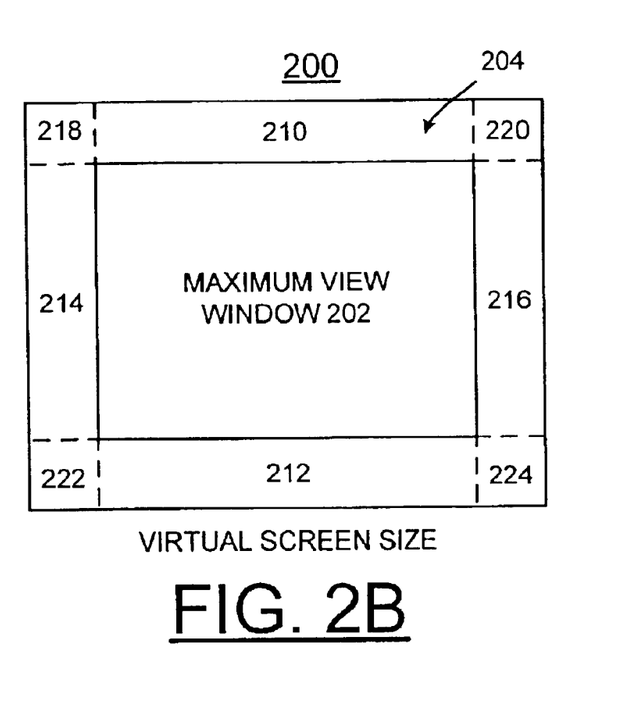
Figure 2C:
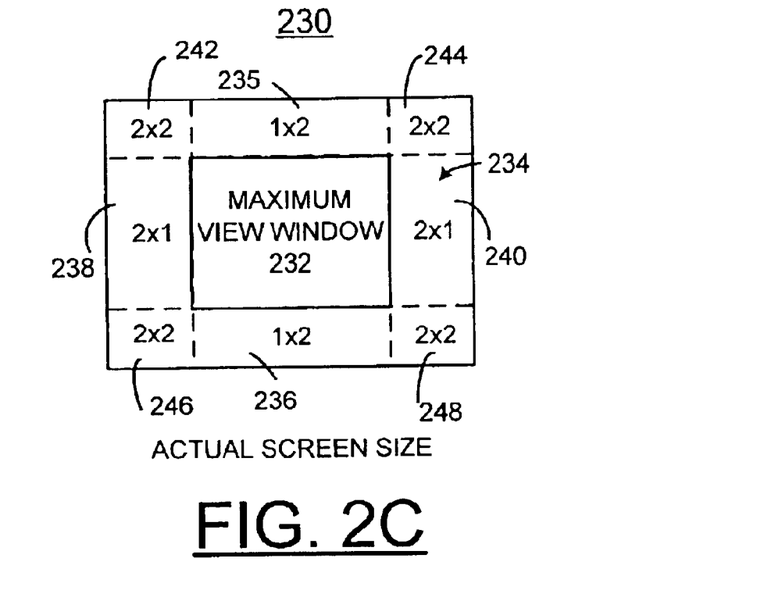
FIGS. 2C and 2D are block diagram representations respectively illustrating an actual screen size with exemplary multiple compression ratios with a centered maximum view window and with an offset maximum view window in accordance with the preferred embodiment.
Figure 2D:
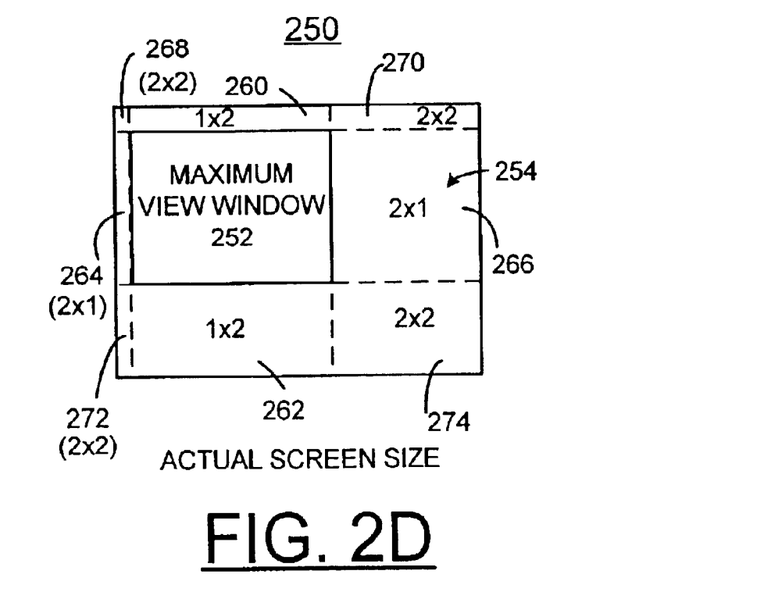

Referring now to FIGS. 2A, 2B, 2C and 2D, there are shown exemplary virtual screens and exemplary actual screens for implementing enlarged virtual screen using dynamic zone compression of screen content in accordance with the preferred embodiment. In FIG. 2A, there is shown a virtual screen size generally designated by 200 with a maximum view window 202 in accordance with the preferred embodiment. The maximum view window 202 within the virtual screen 200 is not compressed and is surrounded by a border compression area 204, as shown in FIG. 2A. In FIG. 2B, there are shown multiple exemplary border compression zones 210, 212, 214, 216, 218, 220, 222, and 224 around the maximum view window 202 within the virtual screen size 200.

In FIG. 2C, there is shown an actual screen size generally designated by 230 with a maximum view window 232 and a compression area 234. Exemplary multiple compression ratios are indicated within each of a plurality of compression zones 235, 236, 238, 240, 242, 244, 246 and 248. In FIG. 2C, the maximum view window 232 is generally located in the center of the actual screen size 230. As illustrated, the compression zones 235, 236, 238, and 240 are compressed in one direction and the corner compression zones 242, 244, 246 and 248 are compressed in both directions. Compression ratios of 1×2 are shown in the upper and lower compression zones 235, 236 and compression ratios of 2×1 are shown in the left and right side compression zones 238, 240. In the corner compression zones 242, 244, 246 and 248 compression ratios of 2×2 are shown.

In FIG. 2D, there is shown an actual screen size generally designated by 250 with a maximum view window 252 and a compression area 254 with exemplary multiple compression ratios indicated within each of a plurality of compression zones 260, 262, 264, 266, 268, 270, 272 and 274. As shown in FIG. 2C, the maximum view window 232 is generally located in the upper left portion of the actual screen size 250. The area of the upper compression zone 260, left side compression zone 264, upper corner compression zones 268 and 270 and the lower right corner compression zone 272 is significantly smaller than the area of the lower compression zone 262, right side compression zone 266, and the lower left corner compression zone 274. Identical compression ratios are indicated within the compression zones 260, 262, 264, 266, 268, 270, 272 and 274 of the compression area 254 as shown in the similar compression zones of compression area 232 of FIG. 2C.

It should be understood that the present invention is not limited to a compression area that surrounds a maximum view window. For example, the compression area could be positioned only on two sides of the maximum view window in accordance with the preferred embodiment with the maximum view window located in a corner of the actual display screen. Or, for example, the compression area could be on one half of the screen and the maximum view window on the other half of the screen.

In accordance with features of the preferred embodiment, an enlarged virtual screen can be effectively displayed within a given display screen using dynamic zone compression of the preferred embodiment, without the confusions of standard grid-based virtual desktops. The entire virtual screen is always visible and directly selectable, including buttons, fields, text, and other objects in the displayed windows. For example, with a two to one compression of the compression area 234 around the maximum view window 232 or compression area 254 around the maximum view window 252, the same virtual desktop can fit, for example, within 61% of the screen space required without the zone compression of the preferred embodiment. Conversely, a screen space 60% larger can be shown in the same screen space. For example, a 1024×768 pixel virtual screen can be mapped onto an 800×600 pixel actual display screen, with essentially no loss of function. An uncompressed focus window remains fully legible and full sized, and the compression zones are compressed. The displayed virtual screen or graphical user interface of the preferred embodiment is more usable by an average user, and is faster to use than other virtual desktops, where the user must first pull a window up on the screen through a combination of keystrokes and/or mouse selections.

Figure 3A:
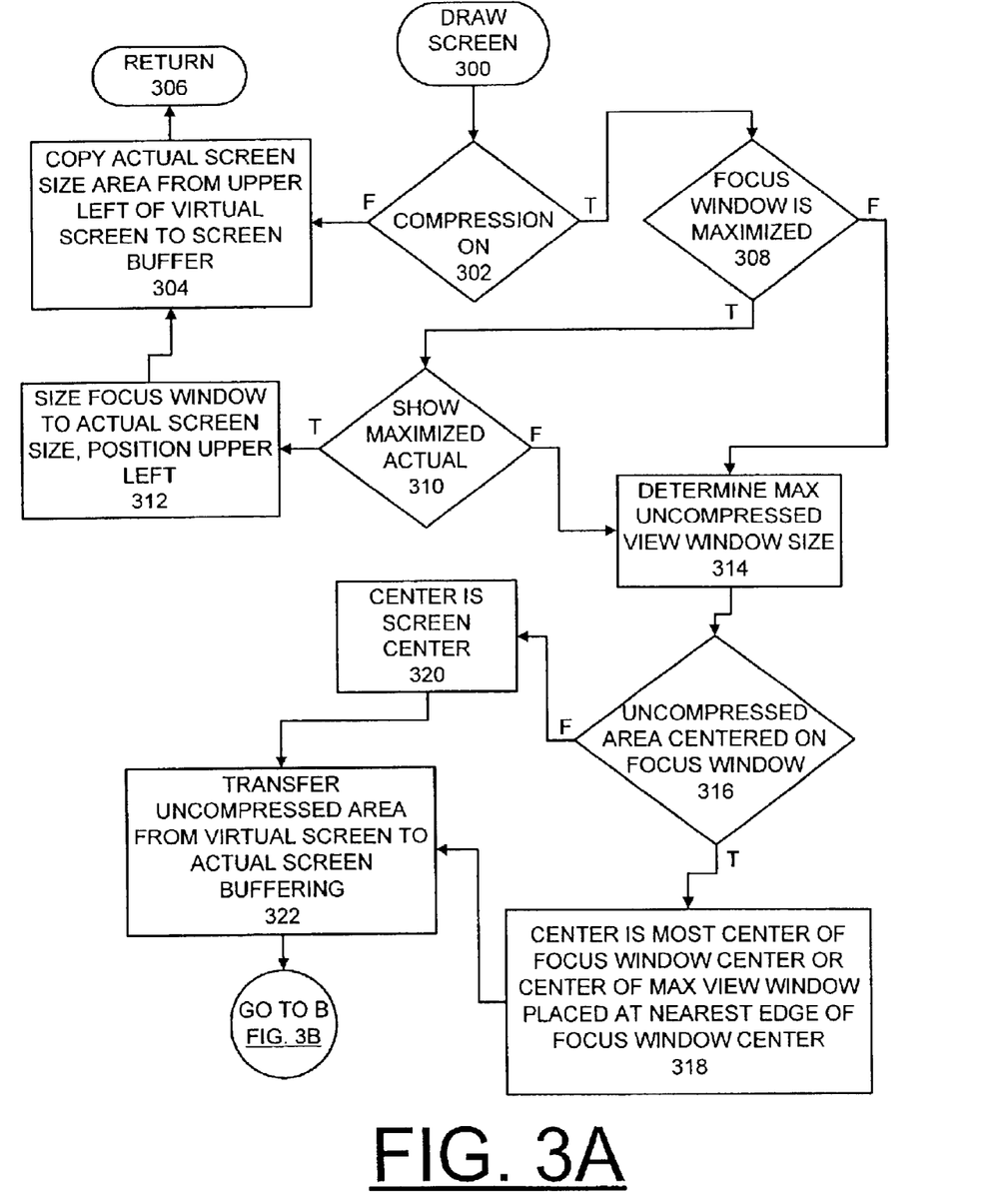
FIGS. 3A, 3B, and 4 are flow charts illustrating exemplary steps for implementing enlarged virtual screen using dynamic zone compression of screen content in accordance with the preferred embodiment.
Figure 3B:
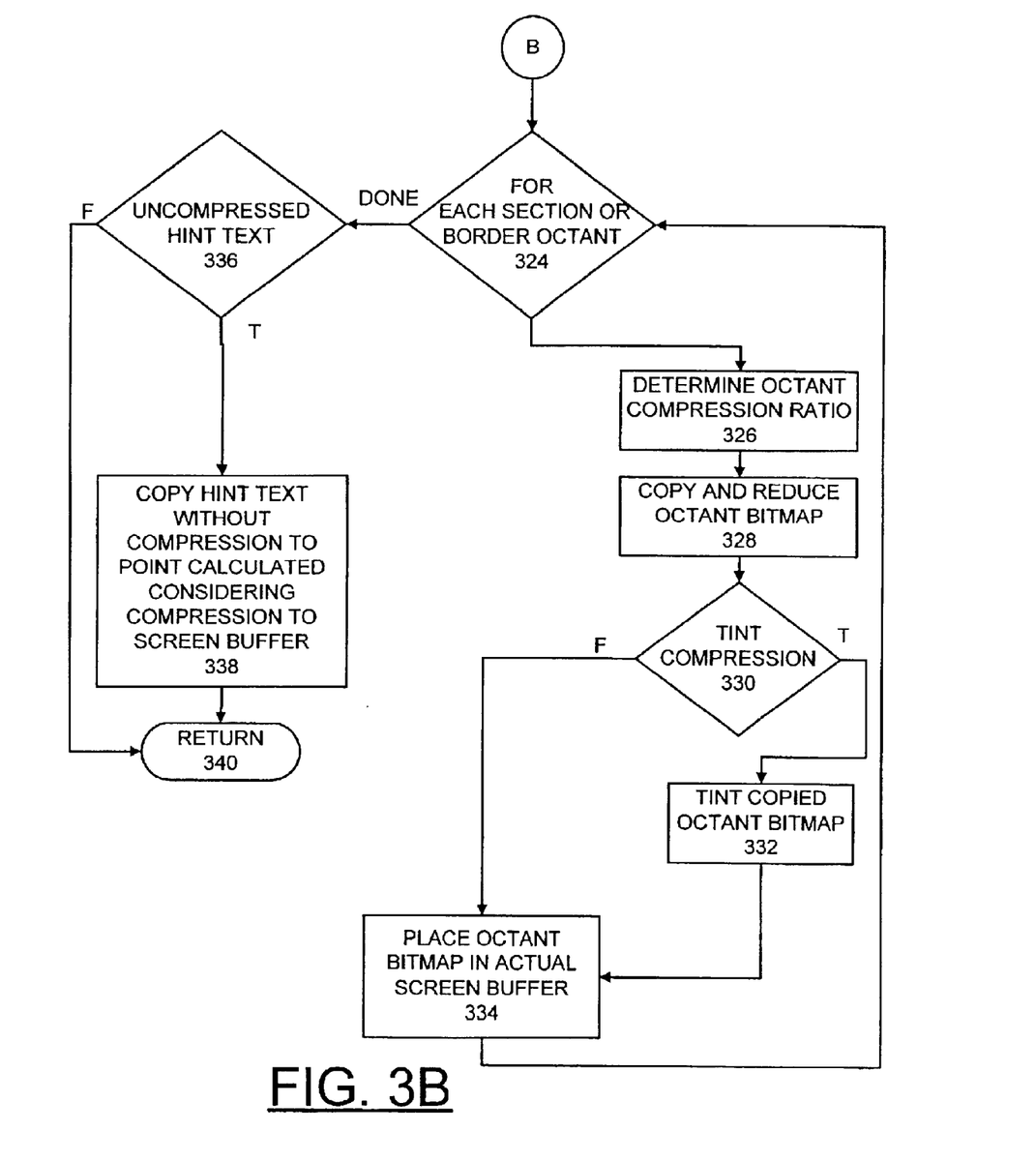

Referring now to FIGS. 3A and 3B, there are shown exemplary steps for implementing enlarged virtual screen using dynamic zone compression of screen content in accordance with the preferred embodiment. Referring to FIG. 3A, sequential operations of a draw screen routine are shown starting at a block 300. Checking whether compression on setting is performed as indicated in a decision block 302. When compression is not used, the actual screen area is copied from the upper left of virtual screen to a screen buffer as indicated in a block 304. Then the sequential operations return as indicated in a block 306. Convention is that screens too big to display are shown from the upper left to the extent of the available actual screen area. However, it should be understood that the present invention is not limited to that centering, showing the screen from upper right, or placing the screen in a scrolling viewing area are within the spirit and scope of the invention.

When compression is used, then checking is performed to determine whether the focus window is maximized as indicated in a decision block 308. When the focus window is maximized, checking for a maximized actual selection as shown in user settings 500 of FIG. 5 is performed as indicated in a decision block 310. When maximized actual selection is found, then the focus window is sized to the actual screen size and positioned to upper left as indicated in a block 312, so that the maximized focus window is made to cover the entire actual viewing area. Then the actual screen area is copied from the upper left of virtual screen to a screen buffer at block 304. Then the sequential operations return at block 306. Otherwise, when the maximized actual selection is not identified, then a maximum uncompressed view window size is determined as indicated in a block 314. The maximum uncompressed view window size is determined, for example, by using the equation:

Virtual size−(compression ratio (virtual size−actual size)/(compression ratio−1))

For example, the maximum uncompressed width of a 1024 pixel virtual window shown in an 800 width actual window with a border compression of 2 would indicate a maximum width of 564 pixels for the maximum uncompressed view window.

Checking is performed to determine whether uncompressed area centered on the focus window is selected as indicated in a decision block 316. When uncompressed area centered on the focus window is selected, then the center is placed at the most center of the focus window or the center of maximum view window is placed at nearest edge of focus window center as indicated in a block 318. This prevents the uncompressed viewing area from being placed off the actual viewing screen. When uncompressed area centered on the focus window is not selected, the center is placed at the screen center as indicated in a block 320. Next the uncompressed area from the virtual screen is transferred to the actual screen buffer as indicated in a block 322. The sequential steps continue following entry point B in FIG. 3B.

Referring to FIG. 3B, for each section or border octant within the compression area as indicated in a decision block 324, an octant compression ratio is determined as indicated in a block 326. Each section or border octant within the compression area at block 324 refers to a compression area according to the division and arrangement of the maximum view window and compression areas on the screen. As shown in FIGS. 2C and 2D, the respective illustrated compression areas 234 and 254 includes eight compression zones or border octants 235, 236, 238, 240, 242, 244, 246, 248; and 260, 262, 264, 266, 268, 270, 272 and 274. The octant bitmap is copied and reduced as indicated in a block 328. For other cases, the border octants may be small, indeed so mall as to be zero, as is the case when the compression is on one half of the screen and the maximum view window is on the other half of the screen. Checking a tint compression selection as specified by the user preferences 500 of FIG. 5 is performed as indicated in a decision block 330. When tint compression is true, then the copied octant bitmap is tinted as indicated in a block 332. Otherwise the octant bitmap is placed in the actual screen buffer as indicated in a block 334. After processing each border octant is done, then checking for uncompressed hint text is performed as indicated in a decision block 336. When uncompressed hint text is selected, then the hint text is copied without compression to a point calculated considering compression to the actual screen buffer as indicated in a block 338. Then the sequential operations return as indicated in a block 340.

Figure 4:
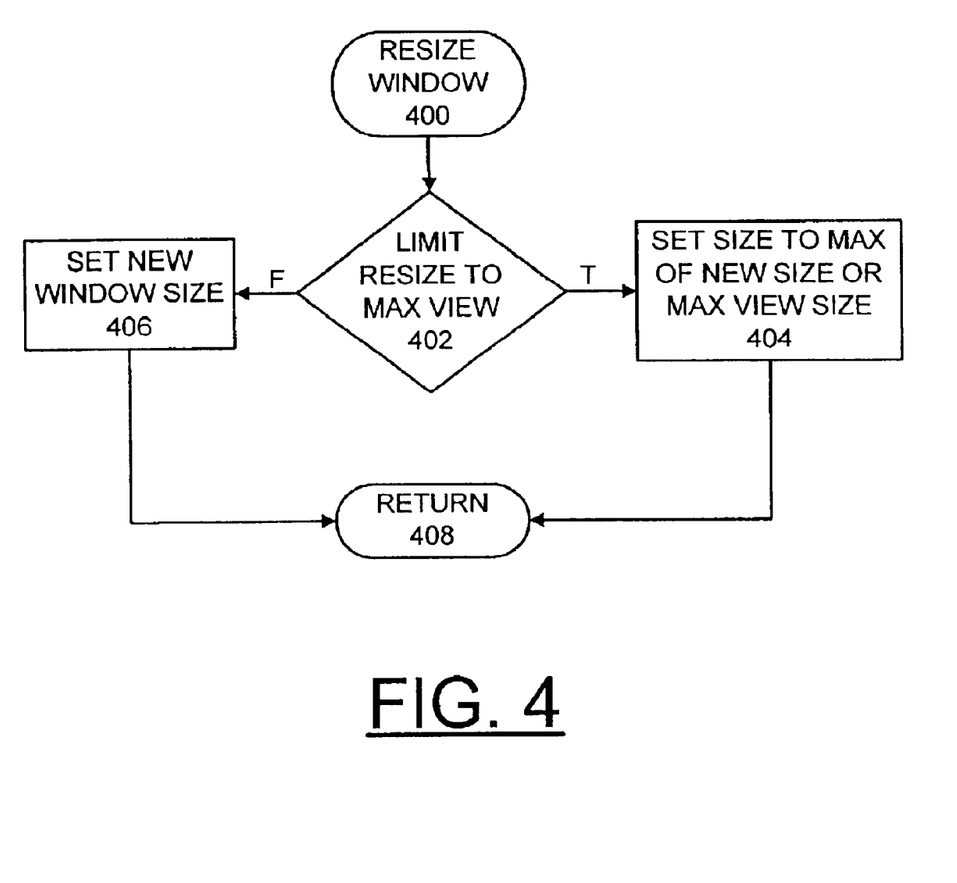
Figure 5:
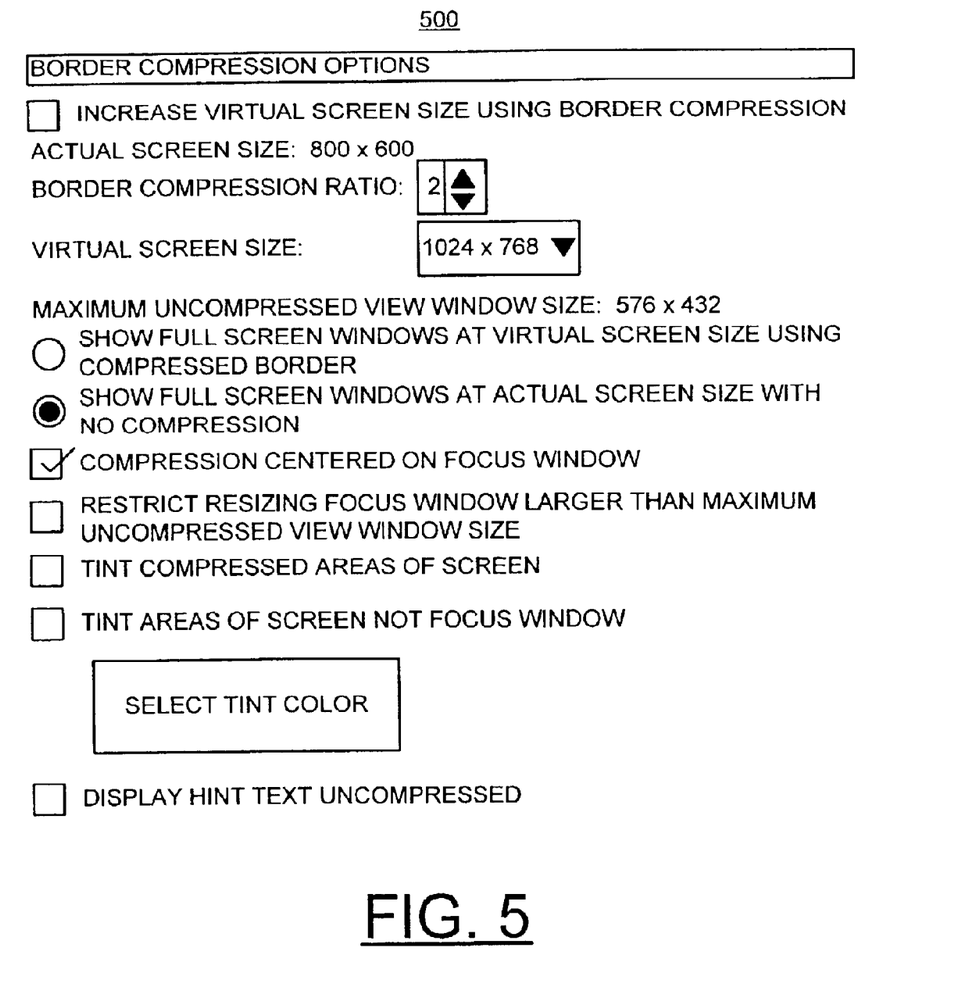
FIG. 5 is an exemplary display screen of the system of FIG. 1 illustrating an exemplary user interface for providing user selections in accordance with the preferred embodiment.

Referring to FIG. 4, there are shown exemplary steps of a resize window routine starting at a block 400 for implementing enlarged virtual screen using dynamic zone compression of screen content in accordance with the preferred embodiment. Checking for a limit resize to a maximized view selection is performed as indicated in a decision block 310. When the limit resize to a maximized view selection is identified, the window size is set to the maximum of the new window size or the maximized view size as indicated in a block 404. When the limit resize to a maximized view selection is not identified, then window size is set to the new window size as indicated in a block 406. Then the sequential operations return as indicated in a block 408.

FIG. 5 is an exemplary display screen generally designated by 500 illustrating an exemplary user interface for providing user selections for implementing dynamic zone compression of screen content in accordance with the preferred embodiment. A user selected option to increase virtual screen size using border compression is stored as the compression on/off and compression options 136. An actual screen size is displayed as set in the operating system. User selected options are received and stored for the user selected border compression ratio 138 and the user selected virtual screen size 140. User selected options to show full screen size at virtual screen size using border compression or to show full screen windows at actual screen size using no compression are stored as option 141. A maximum uncompressed view window size 142 is displayed. User selected options are received and stored for the user selections for the compression centered on focus window 144, to restrict resizing focus window larger than the maximum uncompressed view window size 146, to tint the compression areas of the screen and tint color selections 148, and to display hint text uncompressed 150.

It should be understood that the actual window could itself be a subsection of a larger display area. It should also be understood that the compression areas could be subdivided and each subsection have a different compression ratio. It should also be understood that compression in the x direction could be different than in the y direction or could be a different ratio on one side of the maximum view window than the other side of the maximum view window.

It should be understood that the compression on/off 136 or compression mode might be turned on and off depending on detectable conditions, such as which programs are currently in use, whether an external monitor is being used, and which monitor is being used.

Figure 6:
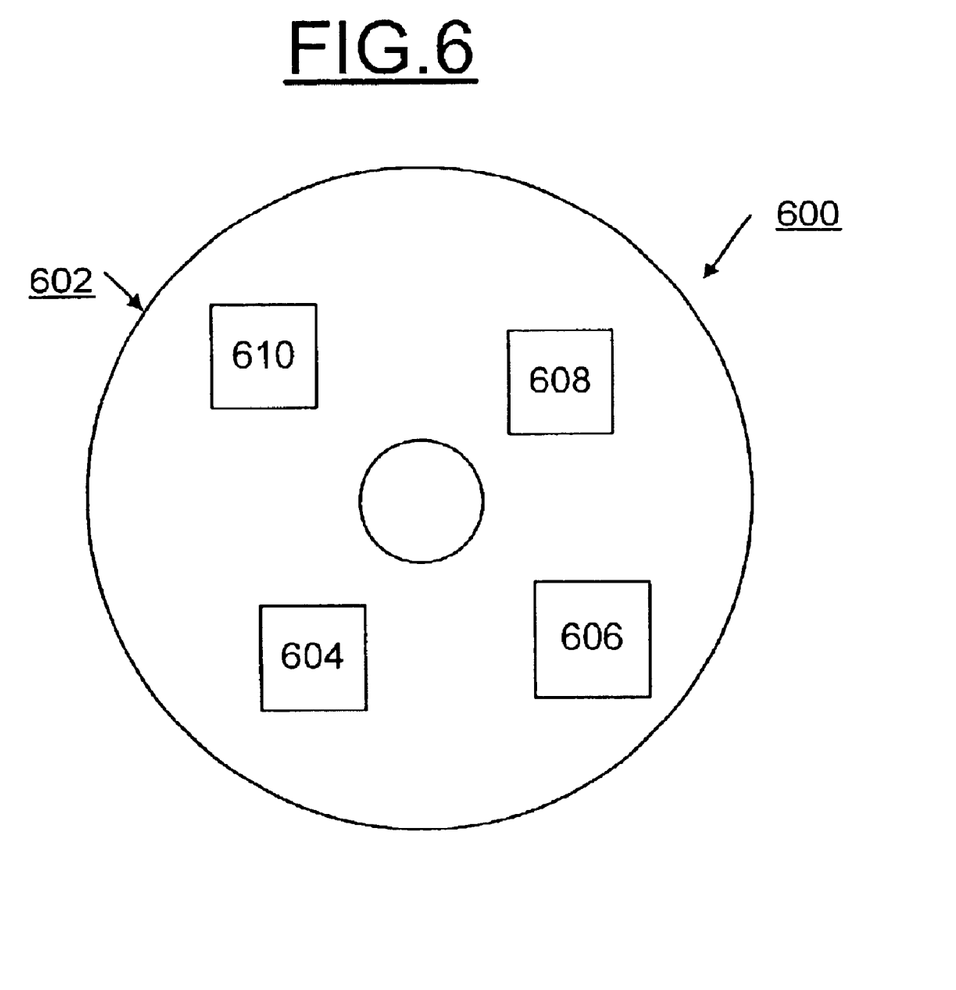
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing enlarged virtual screen using dynamic zone compression of screen content of the preferred embodiment in the system 100 of FIG. 1.

A sequence of program instructions or a logical assembly of one or more interrelated modules defined by the recorded program means 604, 606, 608, 610, direct the computer system 100 for implementing enlarged virtual screen using dynamic zone compression of screen content of the preferred embodiment.

While the present invention has been described with reference to the details of the embodiments of the invention shown in the drawing, these details are not intended to limit the scope of the invention as claimed in the appended claims.

What is claimed is:

1. A method for implementing enlarged virtual screen using dynamic zone compression of screen content in a graphical user interface of a computer system comprising the steps of:

determining a maximum uncompressed view window size;

transferring an uncompressed area from a virtual screen to an actual screen buffer;

for each zone within a compression area, identifying a compression ratio, copying and reducing a zone bitmap according to said identified compression ratio; and transferring said reduced zone bitmap to said actual screen buffer; and identifying a tint compression selection and tinting said reduced zone bitmap.

2. A method for implementing enlarged virtual screen using dynamic zone compression of screen content as recited in claim 1 includes the step of identifying a user selection to show full screen windows at virtual screen size using a compressed border.

3. A method for implementing enlarged virtual screen using dynamic zone compression of screen content in a graphical user interface of a computer system comprising the steps of:

determining a maximum uncompressed view window size;

transferring an uncompressed area from a virtual screen to an actual screen buffer;

for each zone within a compression area, identifying a compression ratio, copying and reducing a zone bitmap according to said identified compression ratio; and transferring said reduced zone bitmap to said actual screen buffer; and identifying an uncompressed hint text selection and copying hint text without compression to a point within said actual screen buffer based upon said identified compression ratio.

4. A method for implementing enlarged virtual screen using dynamic zone compression of screen content as recited in claim 3 includes the step of identifying an uncompressed area centered on focus window selection and determining a center of the uncompressed area based upon a focus window in the graphical user interface.

5. A method for implementing enlarged virtual screen using dynamic zone compression of screen content as recited in claim 3 includes the step of receiving a user selection for a virtual screen size.

6. A method for implementing enlarged virtual screen using dynamic zone compression of screen content as recited in claim 3 includes the step of receiving a user selection for said compression ratio for said zones within said compression area.

7. Apparatus for implementing enlarged virtual screen using dynamic zone compression of screen content in a graphical user interface of a computer system comprising:

a desktop zone compression management program;

said desktop zone compression management program receiving user selections and storing border compression options and data; said stored border compression options and data including an uncompressed hint text selection;

said desktop zone compression management program determining a maximum uncompressed view window size;

said desktop zone compression management program transferring uncompressed area from a virtual screen to an actual screen buffer;

said desktop zone compression management program, for each zone within a compression area, identifying a compression ratio, copying and reducing a zone bitmap according to said identified compression ratio; and transferring said reduced zone bitmap to said actual screen buffer; and said desktop zone compression management program copying hint text without compression to a point calculated based upon said identified compression ratio within said actual screen buffer.

8. Apparatus for implementing enlarged virtual screen using dynamic zone compression of screen content as recited in claim 7 wherein said stored border compression options and data includes a compression centered on focus window selection and said desktop zone compression management program identifying a screen center based upon a focus window in the graphical user interface.

9. Apparatus for implementing enlarged virtual screen using dynamic zone compression of screen content as recited in claim 7 wherein said stored border compression options and data includes a focus window resizing restriction and said desktop zone compression management program limiting window resizing to a maximum of a new window size or said maximum uncompressed view window size.

10. Apparatus for implementing enlarged virtual screen using dynamic zone compression of screen content as recited in claim 7 wherein said stored border compression options and data includes a user selection to show full screen windows at virtual screen size using a compressed border.

11. A computer program product for implementing enlarged virtual screen using dynamic zone compression of screen content in a graphical user interface of a computer, said computer program product including a plurality of computer executable instructions stored on a computer readable medium, wherein said instructions, when executed by said computer, cause the computer to perform the steps of:

determining a maximum uncompressed view window size;

identifying an uncompressed hint text selection;

transferring uncompressed area from a virtual screen to an actual screen buffer;

for each zone within a compression area, identifying a compression ratio, copying and reducing a zone bitmap according to said identified compression ratio; and transferring said reduced zone bitmap to said actual screen buffer; and copying hint text without compression to a point within said actual screen buffer based upon said identified compression ratio.

12. A computer program product for implementing enlarged virtual screen using dynamic zone compression of screen content as recited in claim 11 wherein said instructions, when executed by said computer, further cause the computer to perform the steps of:

identifying a compression centered on focus window selection; and and wherein the step of transferring uncompressed area from said virtual screen to said actual screen buffer includes the step of:

identifying a screen center based upon a focus window in the graphical user interface.

13. A computer program product for implementing enlarged virtual screen using dynamic zone compression of screen content as recited in claim 11 wherein said instructions, when executed by said computer, further cause the computer to perform the steps of:

identifying a focus window resizing restriction; and limiting window resizing to a maximum of a new window size or said maximum uncompressed view window size.

* * * * *